United States Patent [19]
Potter

[11] Patent Number: 5,997,779
[45] Date of Patent: Dec. 7, 1999

[54] TEMPERATURE MONITOR FOR GYPSUM BOARD MANUFACTURING

[75] Inventor: Joseph T. Potter, Eugene, Oreg.

[73] Assignee: AKI Dryer Manufacturer, Inc., Eugene, Oreg.

[21] Appl. No.: 09/069,416

[22] Filed: Apr. 29, 1998

Related U.S. Application Data

[62] Division of application No. 08/768,274, Dec. 18, 1996, abandoned.

[51] Int. Cl.⁶ .......................... B32B 31/00; B32B 31/06; G01K 1/02
[52] U.S. Cl. .................. 264/40.1; 156/39; 156/64; 156/346; 264/333; 374/141; 374/186; 374/208; 425/170
[58] Field of Search ...................... 156/39, 64, 346, 156/347, 348, 359; 264/40.1, 40.6, 333; 425/169, 170; 374/208, 141, 186

[56] References Cited

U.S. PATENT DOCUMENTS

| | | |
|---|---|---|
| 4,117,059 | 9/1978 | Murray . |
| 4,169,747 | 10/1979 | De Rooy et al. . |
| 4,186,592 | 2/1980 | Eirich et al. . |
| 4,400,684 | 8/1983 | Kushida et al. . |
| 4,626,389 | 12/1986 | Lempfer et al. . |
| 4,987,579 | 1/1991 | Yoshinaka et al. . |
| 4,989,992 | 2/1991 | Piai . |
| 4,996,909 | 3/1991 | Vache et al. . |
| 5,198,052 | 3/1993 | Ali . |
| 5,207,765 | 5/1993 | Eiermann et al. . |
| 5,211,476 | 5/1993 | Coudroy . |
| 5,221,386 | 6/1993 | Ensminger et al. . |
| 5,534,292 | 7/1996 | Mitsuo . |
| 5,707,179 | 1/1998 | Bruckelmyer . |

*Primary Examiner*—Steven D. Maki
*Attorney, Agent, or Firm*—John L. Rogitz

[57] ABSTRACT

The temperature profile over time of gypsum boards is monitored as the boards harden, to facilitate effective curing of the boards prior to removing excess water therein in an industrial dryer. A substrate is moved by a curing conveyor beneath a gypsum slurry mixer, and the mixer pours slurry onto the substrate. Just prior to the substrate passing under the mixer, an operator places a temperature monitor onto the substrate. The temperature monitor includes a temperature sensor and a microprocessor that receives and stores the signal from the temperature sensor. The temperature monitor is configured such that the height of the sensor is equal to one-half the height of the hardening boards. The slurry that has poured onto the monitor hardens into a test board, and when the test board arrives at the end of the curing conveyor, an operator breaks open the test board, removes the monitor, and connects the microprocessor in the monitor to a computer via a serial port cable. The computer outputs a temperature profile as recorded by the monitor, with the temperature profile being representative of the efficacy of the curing of the boards in the particular batch of boards that were poured with the test board.

7 Claims, 2 Drawing Sheets

TEMPERATURE MONITOR FOR GYPSUM BOARD MANUFACTURING

This application is a divisional of application Ser. No. 08/768,274, filed Dec. 18, 1996 for an invention entitled "Temperature Monitor for Gypsum Board Manufacturing" now abandoned.

FIELD OF THE INVENTION

The present invention relates generally to processes for making construction materials, and more particularly to manufacturing gypsum boards that are used as wall boards in structures.

BACKGROUND

Gypsum boards are widely used as wall boards in structures. In making gypsum boards, a water-based gypsum slurry is poured from a mixer onto a substrate that is being conveyed under the mixer. The slurry hardens on the substrate and is cut into panels, and then excess water is removed from the panels by conveying the panels through a large industrial dryer.

The present invention recognizes that it is important to properly cure the hardening gypsum as it is conveyed to the dryer, prior to advancing the gypsum panels into the dryer. Improper curing of the gypsum can result in low-grade or indeed unacceptable gypsum boards. As further recognized herein, however, the current method being used addresses proper curing only in an ad hoc, hit-or-miss way. More particularly, improper board curing is typically noticed only after hundreds or perhaps thousands of gypsum boards have been poured, cured, dried, and then noted to be unsatisfactory. Not only is this wasteful, but the typical delay in noticing the results of improper curing in turn delays the production of acceptable gypsum boards. Fortunately, the present invention understands that the curing of gypsum boards is related to the internal temperature of the boards, and that a system can be provided with this understanding in mind to monitor board curing.

Accordingly, it is an object of the present invention to provide a method and apparatus for monitoring the temperature profile over time of gypsum boards as they cure, to promote effective curing. Another object of the present invention is to provide a method and apparatus for monitoring the interior temperature profile over time of gypsum boards. Still another object of the present invention is to provide a method and apparatus for monitoring the interior temperature profile over time of gypsum boards, which can be used in conjunction with a number of board thicknesses. Yet another object of the present invention is to provide a method and apparatus for monitoring the curing gypsum boards which is easy to use and cost-effective.

SUMMARY OF THE INVENTION

A method is disclosed for monitoring the curing of gypsum boards or panels. The method includes disposing a temperature monitor on a substrate and conveying the substrate beneath a mixer. Gypsum slurry is then poured from the mixer onto the substrate, and a signal is received from the temperature monitor that is representative of the temperature profile of the curing gypsum over time.

Preferably, the receiving step is undertaken by retrieving the temperature monitor from the gypsum and connecting the temperature monitor to a computer. As disclosed in greater detail below, the temperature monitor includes a temperature sensor and a data storage device for receiving signals from the sensor and storing the signals.

The preferred method further includes determining the thickness of the curing gypsum material, and establishing the height of the temperature sensor above the substrate to be one-half of the thickness of the material. Preferably, the establishing step includes adhering a spacer to the temperature monitor prior to disposing the monitor on the substrate. The method for monitoring is also disclosed in combination with cutting the gypsum into panels and disposing the panels in a dryer to remove excess water therefrom.

In another aspect, a device for recording an interior temperature of a curing gypsum material defining a thickness includes a monitor defining a bottom surface. A temperature sensor is disposed in the monitor and spaced from the bottom surface by a distance equal to one-half of the thickness of the curing gypsum material. Accordingly, the temperature sensor generates a temperature signal representative of the interior temperature of the material. A data storage device is disposed in the monitor for recording temperature signals therefrom.

In yet another aspect, a system for monitoring gypsum as it cures includes a mixer for holding a gypsum slurry, a substrate, and a conveyor for moving the substrate under the mixer such that the slurry is poured onto the substrate. At least one curing monitor is disposed on the substrate and is covered by the slurry.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
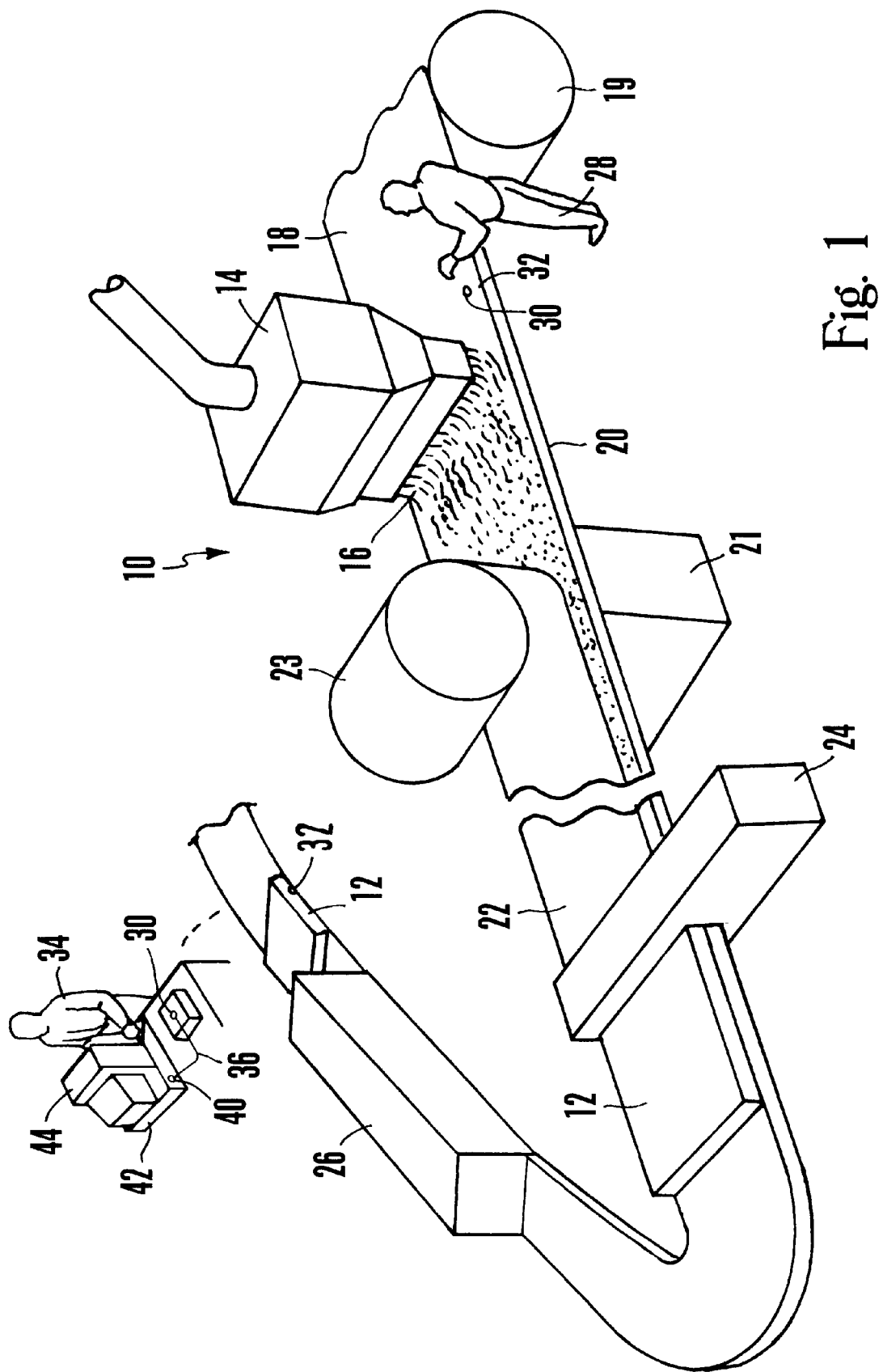
FIG. 1 is a schematic view of a gypsum board curing system, with the panel cutter shown in phantom.

Referring initially to FIG. 1, a system is shown, generally designated 10, for forming and curing gypsum boards or panels 12. As shown, the system 10 includes a mixer 14 that contains a water-based gypsum slurry 16. A paper substrate 18 is unrolled from a lower supply spool 19 and translationally moved beneath the mixer 14 by a curing conveyor 20, such that gypsum slurry 16 is poured onto the substrate 18 as shown. The slurry 16 hardens very quickly after being poured onto the substrate 18. As the hardened gypsum is conveyed away from the mixer 14, it passes over a forming table 21.

A paper cover 22 is unrolled from an upper supply spool 23 over the forming table 21 and onto the hardening slurry as shown. After being conveyed about eight hundred feet (800') from the forming table 21, the hardened gypsum material is cut by a guillotine-style cutter 24 into the panels 12 in accordance with well-understood principles of the art. At the end of the curing conveyor 20, the panels 12 are advanced into a dryer 26 for removing excess water from the panels 12. The preferred system 10 described thus far can be purchased from the present assignee.

As intended by the present invention, the system 10 includes a means for monitoring the curing of the gypsum on the substrate 18, so that the composition of the slurry 16 and/or speed of the curing conveyor 20 can be adjusted accordingly to promote effective curing of the gypsum prior to the panels 12 being advanced into the dryer 26. More particularly, as shown in FIG. 1 an operator 28 can place a temperature monitor 30 onto a portion of the substrate 18, before the gypsum slurry 16 is poured onto the portion of the substrate 18. Preferably, the operator 28 makes a pen or other mark 32 on the conveyor 20 or wall of the portion of the substrate 18 to indicate the approximate location of the monitor 30. In accordance with the present invention, the operator 28 periodically places a monitor 30 onto the substrate 18.

As described in detail below, each temperature monitor 30 senses and stores temperature information over time. It will readily be appreciated that this temperature information is representative of an interior temperature of the gypsum on the substrate 18.

After the panels 12 have been conveyed through the dryer 26, an operator 34 notes the marks 32 and accordingly retrieves the panels 12 (i.e., the "test panels") that are adjacent the marks 32. The operator breaks open each test panel 12 and retrieves the monitor 30 therefrom. Then, the operator 34 attaches a computer serial port cable 36 to a connector 38 (shown in FIG. 2 below) of the monitor 30, with the connector 38 being configured for receiving a personal computer (PC) serial port cable. The cable 36 is also connected to a serial port 40 of a computer, preferably a PC 42, and the data in the temperature monitor 30 retrieved by the PC 42 for recording the data and displaying the data on an output device 44. The output device 44 can be a printer, monitor, or other suitable output device. Based on the temperature profile of the test panel 12 so output, the operators of the system 10 can adjust appropriate parameters, such as conveyor 20 speed and slurry 16 water content, to facilitate effective curing of the gypsum.

Figure 2:
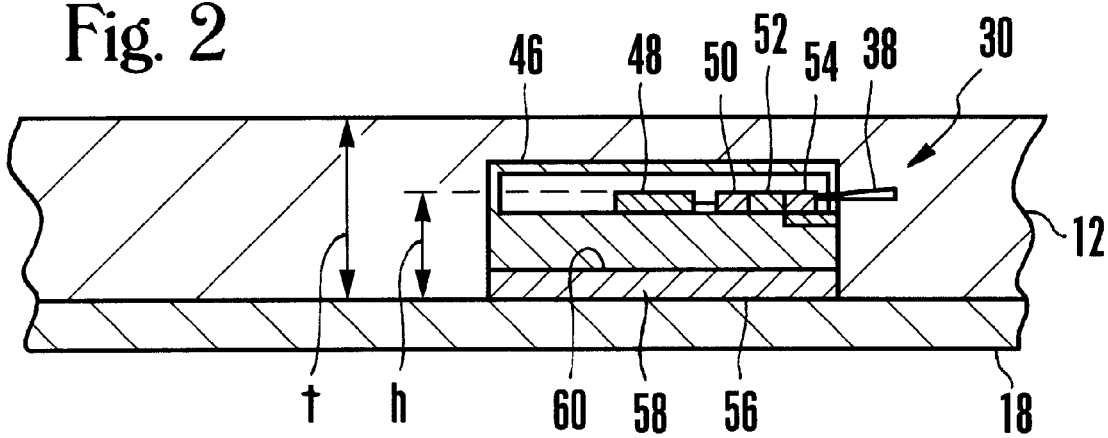
FIG. 2 is a cross-sectional view of a temperature monitor of the present invention, as seen along the line 2—2 in FIG. 1.

FIG. 2 shows the details of the temperature monitor 30 of the present invention. As shown, the monitor 30 includes a hollow metal housing 46. A temperature sensor 48 is disposed in the housing 46. The temperature sensor 48 can be a thermocouple, resistance temperature detector (RTD), or other suitable temperature-sensing element.

A microprocessor 50 is also disposed in the housing 46, in data communication with the sensor 48 and with an electronic data storage medium 52. Per the present invention, the microprocessor 50 is an off-the-shelf device, e.g., a 386 model microprocessor. Alternatively, the microprocessor 50 can be embodied in an application specific integrated circuit (ASIC). Also, the storage medium 52 can be read-only memory (ROM), random access memory (RAM), programmable memory such as PROM or EPROM, or other suitable memory. A computer clock 54 is also associated with the microprocessor 50.

As envisioned by the present invention, the gypsum panel 12 in which the temperature monitor 30 is disposed defines a thickness "t", and the height "h" of the temperature sensor 48 above a bottom surface 56 of the monitor 30 is one-half the thickness of the gypsum panel 12 (½t). Thus, the skilled artisan will appreciate that the temperature sensor 48 is located in the middle (with respect to the vertical dimension) of the gypsum panel 12. Accordingly, the temperature measured by the temperature sensor 48 is the core temperature of the gypsum panel 12.

As also shown in FIG. 2, to establish the height of the temperature sensor 48 as described above, a paper or plastic spacer 58 having an adhesive surface 60 can be positioned with the adhesive surface 60 against the bottom of the housing 46, to thereby establish the bottom surface 56 of the monitor 30. Indeed, plural spacers 58 can be stacked as necessary to establish the height "h" of the sensor 48 to be equal to ½t.

Figure 3:
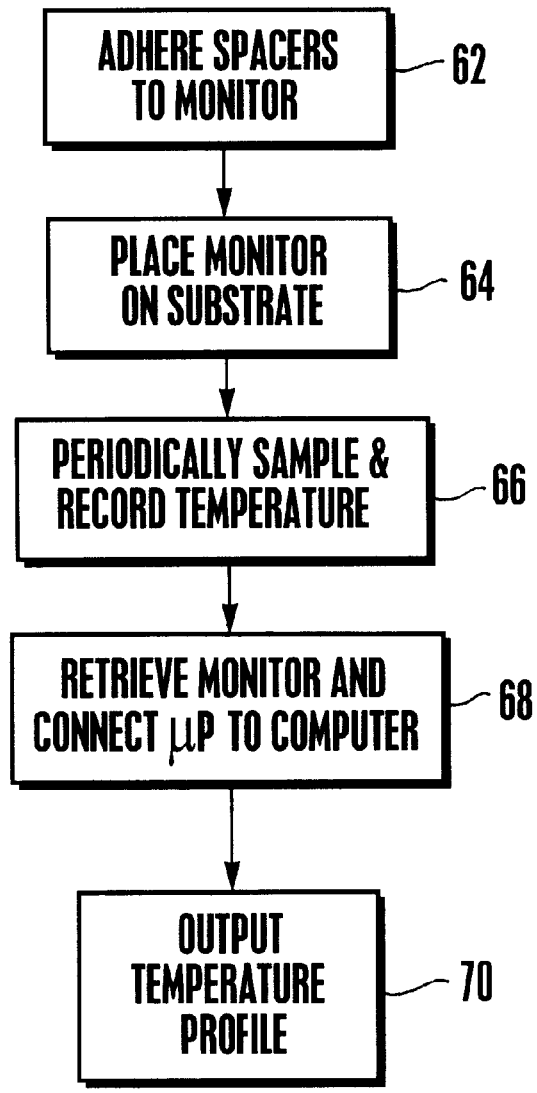
FIG. 3 is a flow chart showing the method steps of the present invention.

FIG. 3 illustrates the method of the present invention, including the structure of the logic of the present invention as embodied in computer-readable logic structures on the storage medium 52 (FIG. 2). Those skilled in the art will appreciate that the Figures illustrate the structures of logic elements that function according to this invention. Manifestly, the invention is practiced in one essential embodiment by a machine component that renders the logic elements in a form that instructs a digital processing apparatus (that is, a computer or microprocessor 50) to perform a sequence of operational steps corresponding to those shown in the Figures.

These instructions may reside in, i.e., be embodied by, logic structures on a data storage device including a data storage medium, such as the storage medium 52 shown in FIG. 2. The machine component is a combination of logic elements that are embodied in the storage medium 52, which advantageously can be electronic read-only memory (ROM) or electronic random access memory (RAM), or other appropriate data storage device. Alternatively, the instructions can be embodied in the form of computer program code elements on semiconductor devices, on magnetic tape, on optical disks, on a DASD array, on magnetic tape, on a conventional hard disk drive, on electronic read-only memory or on electronic random access memory, or other appropriate data storage device.

Commencing at block 62, the spacers 58 are adhered to the housing 46 of the monitor 30 as necessary for establishing the height "h" of the sensor 48 to be one-half the expected thickness "t" of the panels 12. Then, at block 64 the monitor 30 is placed on the substrate 18 and conveyed beneath the mixer 14. Slurry 16 is poured onto the substrate 18 to cover the monitor 30 as described above. If desired, the bottom surface 56 of the monitor 30 can be adhesive, to stick to the substrate 18.

Next, at block 66 the microprocessor 50 periodically samples and records, on the data storage medium 52, the signal from the temperature sensor 48 as the test panel 12 cures. At block 68 the temperature monitor 30 is retrieved from the panel 12 and the microprocessor 50 is connected to the PC 42 via the serial port connector 38. At block 70 the output device 44 presents the temperature profile over time as an indication of the efficacy of the curing of the panels 12 that were poured in the same batch as the test panel.

While the particular TEMPERATURE MONITOR FOR GYPSUM BOARD MANUFACTURING as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. A method for monitoring the curing of gypsum, comprising the steps of:

disposing at least one temperature monitor on a substrate;

conveying the substrate beneath a mixer;

pouring gypsum from the mixer onto the substrate such that the monitor is covered by a portion of the gypsum and curing the gypsum so that the gypsum hardens wherein the monitor generates a signal representative of a temperature profile of the portion of the gypsum over time;

breaking the portion of the gypsum after it hardens to retrieve the monitor from the portion; and receiving the signal from the temperature monitor as a representation of the curing of the gypsum.

2. The method of claim 1, wherein the receiving step includes connecting the temperature monitor to a computer.

3. The method of claim 2, wherein the temperature monitor includes a temperature sensor and a data storage device for receiving signals from the sensor and storing the signals.

4. The method of claim 3, further comprising the step of:

determining a thickness of the gypsum on the substrate; and establishing the height of the temperature monitor above the substrate to be one-half of the thickness of the gypsum.

5. The method of claim 4, wherein the establishing step includes adhering a spacer to the temperature monitor prior to disposing the monitor on the substrate.

6. The method of claim 4, wherein the method is further in combination with the steps of:

cutting the gypsum into panels; and disposing the panels in a dryer to remove excess water therefrom.

7. The method of claim 1, further comprising the step of indicating the location of the substrate on which the temperature monitor has been disposed.

* * * * *